United States Patent [19]

DiDomizio, Jr.

[11] 4,218,925
[45] Aug. 26, 1980

[54] DIFFERENTIAL PRESSURE TRANSMITTER WITH PRESSURE SENSOR PROTECTION

[75] Inventor: Robert A. DiDomizio, Jr., Lansdale, Pa.

[73] Assignee: Honeywell Inc., Minneapolis, Minn.

[21] Appl. No.: 52,576

[22] Filed: Jun. 27, 1979

[51] Int. Cl.² .............................................. G01L 13/02
[52] U.S. Cl. ........................................ 73/706; 73/716; 73/720
[58] Field of Search ........................ 73/716–717, 73/718, 719, 720, 721, 722, 706

[56] References Cited

U.S. PATENT DOCUMENTS

| | | | |
|---|---|---|---|
| 3,313,158 | 4/1967 | Giovanni | 73/720 |
| 3,400,588 | 9/1968 | O'Connor | 73/716 |
| 3,712,143 | 1/1973 | Weaver et al. | 73/720 |
| 3,756,085 | 9/1973 | Hunter | 73/720 |
| 3,841,158 | 10/1974 | Hunter | 73/720 |
| 4,028,945 | 6/1977 | Bergamini | 73/706 |
| 4,072,058 | 2/1978 | Whitehead | 73/720 |
| 4,135,407 | 1/1979 | Ezekiel | 73/706 |
| 4,173,149 | 11/1979 | Critten | 73/716 |

Primary Examiner—Donald O. Woodiel
Attorney, Agent, or Firm—Laurence J. Marhoefer; Lockwood D. Burton; Mitchell J. Halista

[57] ABSTRACT

A differential pressure to electrical signal transmitter has a pair of barrier diaphragms and a pair of nested internal control bellows located between the barrier diaphragms. A first internal volume defined between one barrier diaphragm and a corresponding mating support plate in the transmitter body is pressurized with a first fluid, and a second internal volume defined by the other barrier diaphragm and a respective mating support plate in the transmitter body is pressurized with a second fluid. The first volume is connected by a first fluid of conduit to a first chamber of a differential pressure sensor and is filled with a first incompressible fill fluid. The second volume is connected by a second fluid conduit to a second chamber of the sensor and is filled with a second incompressible fill fluid. The pressures of the two fill fluids act on opposite sides of the differential pressure sensor whereby an electrical output signal is produced dependent on the difference between the fill fluid pressures. The nested bellows are pressurized by the respective fill fluids acting in opposition on each bellows and are used to provide a means for absorbing a fill fluid displaced by a movement of the barrier diaphragm caused by excessive pressure. An overload bottoming of the barrier diaphragm on a mating support plate ultimately isolates the sensor from the overload input pressure and terminates the fill fluid transfer.

8 Claims, 2 Drawing Figures

DIFFERENTIAL PRESSURE TRANSMITTER WITH PRESSURE SENSOR PROTECTION

BACKGROUND OF THE INVENTION

1. Field of the Invention

The present invention is directed to pressure to electrical signal transmitters. More specifically, the present invention is directed to a pressure to electrical signal transmitter having a pressure overload protection means for protecting the pressure sensor used in the transmitter.

2. Description of the Prior Art

Differential pressure transmitters using barrier diaphragms exposed to respective input pressures and a sensor providing an electrical signal representative of the difference in pressure between two applied input pressures are known in the art as shown in the Weaver et al U.S. Pat. No. 3,712,143. Such differential pressure transmitters include a transmitter structure which contains two barrier diaphragms. A first chamber on one side of a first diaphragm is filled with an incompressible fill fluid and a second chamber on one side of the other, or second, barrier diaphragm is filled with a second incompressible fill fluid. The other side of each of the first and second barrier diaphragms is exposed to a respective process, or input, fluid for applying input pressure thereto which may be process fluids derived from respective sides of a so-called orifice plate in a process fluid flow line. In such an application, the transmitter is arranged to produce an electrical output signal representative of differential pressure between the two input fluids. The fill fluids communicate with opposite, or respective, sides of a sensor element, e.g., a strain sensitive semi-conductor chip, which is displaced or deflected by an amount dependent on the difference between the pressures of the fill fluids which, in turn, is representative on the differential pressure of the applied input fluids. The sensor may be located within the transmitter body as shown in the aforesaid Weaver patent or externally of the transmitter body as shown in the Whitehead, Jr. U.S. Pat. No. 4,072,058. Because of the extremely small full range displacement capability of the sensor in transmitters of this type, it has been necessary to equip such transmitters with overload protection arrangements to prevent the sensors from being excessively displaced, or deflected, and, hence, either damaged or destroyed by excessive applied input fluid pressures. In the aforesaid U.S. patents, the transmitters are provided with various input pressure overload arrangements. Other input pressure overload protective structures are shown in U.S. Pat. Nos. 3,313,158; 3,400,588 and 3,841,158. Those prior art input pressure overload protection arrangements exhibit significant shortcomings in that they require an excessive amount of space within a transmitter body to be devoted to the overload protection device and fail to provide an overload protection structure which can be usable with either an externally located sensor or an internally located sensor.

SUMMARY OF THE INVENTION

Accordingly, it is an object of the present invention to provide an improved overload protection means for a differential pressure transmitter.

Another object of the present invention is to provide an improved overload protection means which is usable in a pressure transmitter having either a remote sensor or an internal sensor.

In accomplishing these and other objects, there has been provided, in accordance with the present invention, a pressure transmitter having a first and a second diaphragm defining a first and a second internal space within a transmitter body filled with a first and a second incompressible fill fluid, respectively. A pair of nested bellows are located within the meter body in a chamber separate from the first and second internal spaces and are connected by respective fluid conduits to the first and second fill fluids. A differential pressure sensor responsive to differential fluid pressure is connected by fluid conduits to the first and second fill fluids to sense the fluid pressures thereof. The interior of an inner, or first, one of the two bellows and the interior of the bellows chamber are connected to the first fill fluid. Concurrently, the interior of the outer, or second, one of the two bellows is connected by a fluid conduit to the second fill fluid. A hollow post within the interior of each of the two bellows is used to conduct the fill fluid therein and to bias, or preload, the respective bellows by bearing against an end of the bellows to stretch it beyond a relaxed, or normal, length.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

DETAILED DESCRIPTION OF FIG. 1

Figure 1:
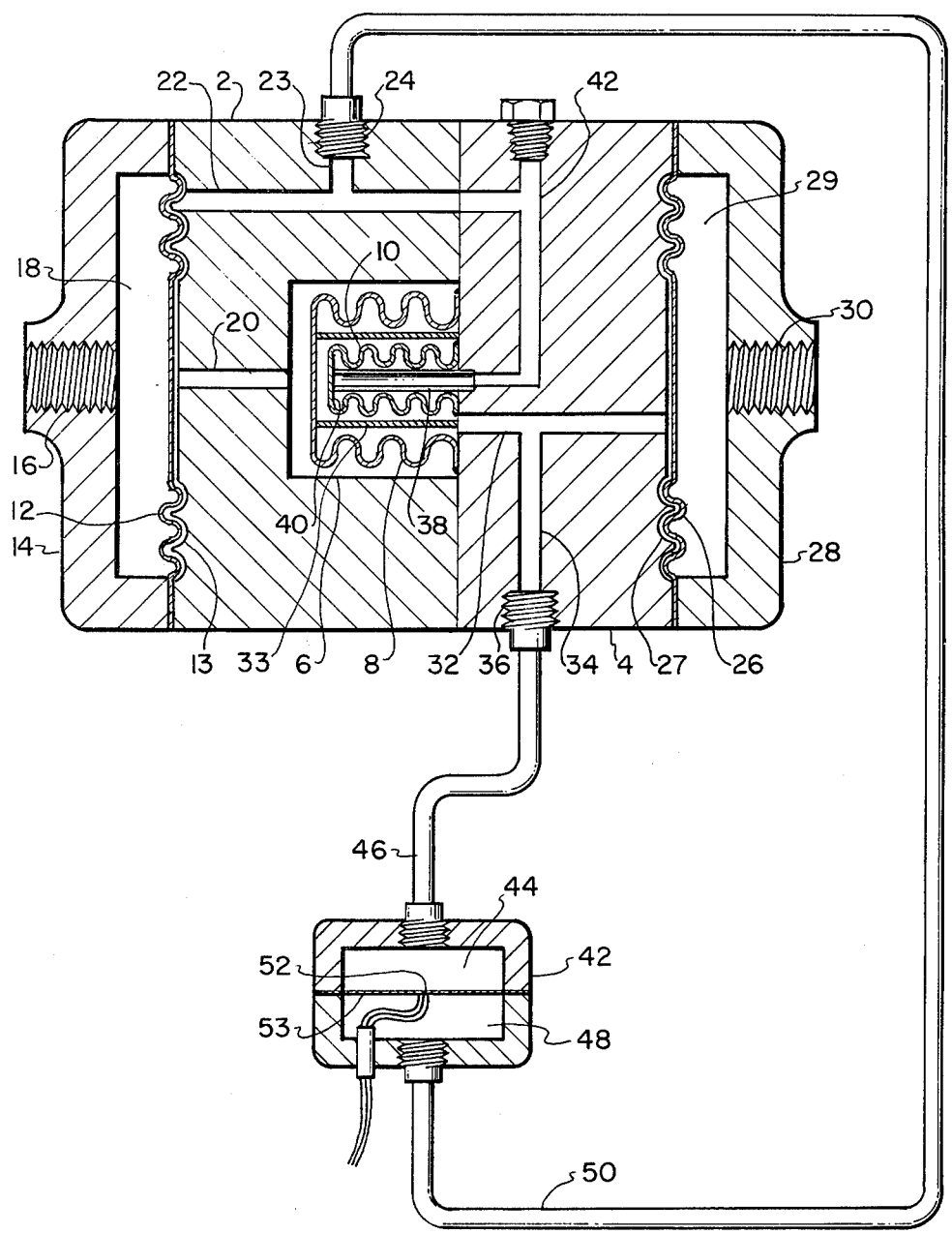
FIG. 1 is a cross-sectional illustration of an example of a pressure transmitter having an external sensor and embodying the pressure overload protection structure of the present invention and FIG. 2 is a cross-sectional illustration of an example of a pressure transmitter having an internal sensor and also embodying the pressure overload protection structure of the present invention.

Referring to FIG. 1 in more detail, there is shown a cross-sectional illustration of a pressure transmitter using the pressure overload protection structure of the present invention for an external differential pressure sensor and having a first transmitter body portion 2 and a second transmitter body portion 4 having mating faces arranged in a side by side abutting fluid-tight relationship. The first transmitter body portion 2 is provided with a hollow chamber 6 of sufficient size to accommodate a pair of nested bellows 8, 10. An outer surface of one face of the first body portion 2 is covered by a diaphragm 12 with annular convolutions formed therein. The adjacent outer surface 13 of the body portion 2 is spaced from the diaphragm 12 to provide a fill fluid space and has annular convolutions which are arranged to mate with the convolutions in the diaphragm 12, as shown in the Whitehead, Jr. U.S. Pat. No. 4,072,058. The diaphragm 12 may preferably be made of a non-corrosive or corrosion resistant metal such as stainless steel. An outer cover 14 is arranged to cover the diaphragm 12 and to clamp the edges of the diaphragm between the cover 14 and the body portion 2 by any suitable attaching means (not shown) to provide a fluid tight seal of the edges of the diaphragm 12. A threaded opening 16 in the cover 12 is provided for connecting the cover 12 to a process fluid inlet pipe (not shown) to admit a process fluid into a recess 18 formed within the cover 14 above the diaphragm 12.

A first fluid conduit 20 is provided within the first body portion 2 between the surface 13 and the chamber 6. A second fluid conduit 22 is provided through the body portion 2 from the surface 13 to an opposite face of the body 2 abutting the second transmitter body portion 4. Additionally, a third fluid conduit 23 is provided within the body 2 between the conduit 22 and a threaded hole 24 extending inwardly from a side face of the body 2.

The second transmitter body portion 4 has a second annularly convoluted diaphragm 26 covering a matching convoluted outer surface 27 of a face of the body 4 and spaced therefrom to provide a fill fluid space in a manner similar to that described above with respect to the first diaphragm 12. A second cover 28 is arranged to cover the second diaphragm 26 in a manner similar to that described for the first diaphragm 12 and cover 14 while providing a fluid chamber, or recess, 29 above a portion of the diaphragm 6. A threaded hole 30 in the cover provides a means for connecting to a fluid pipe arranged to supply a second input process fluid (not shown). A fourth fluid conduit 32 is provided within the second transmitter body portion 4 between the convoluted face 27 of the body 4 beneath the diaphragm 26 and the interior of the first, or outer, bellows 8 of the nested bellows 8, 10.

A first hollow cylindrical preload post 33 is located within the outer bellows 8 and encircling the inner bellows 10. The post 33 is arranged to preload, or bias, the outer bellows 8 by having an open end bearing against a closed end of the bellows 10 and stretching the bellows 10 past a relaxed length. An inner surface of the closed end of the first bellows 8 is arranged to provide a cover for an open end of the hollow post 33 while the other end of the post 33 is sealed to the face of the block 4 except for the port of the fluid conduit 32 which is effective to admit a fill fluid to both sides of the post 33, i.e., the port for the conduit 32 is open to both sides of the post 33. A fifth fluid conduit 34 is provided within the body 4 extending between the fourth fluid passageway 32 and a threaded hole 36 in a side face of the second block 4.

A second hollow preload post 38 is located within the inner, or second, bellows 10 to preload, or bias, the inner bellows 10 by bearing against a closed end of the bellows 10 and stretching the bellows 10 past a relaxed length without touching the end of the first bellows 8. Specifically, an inner surface 40 of the closed end of the second bellows 10 is arranged to provide a cover for an open end of the hollow post 38 while the other end of the post 38 is held in a fixed fluid-tight relationship within a port of a sixth fluid conduit 42 located within the body 4. The conduit 42 communicates between the interior of the hollow post 38 and the second fluid passageway 22 at the junction, or interface, between the first and second body portions 2, 4. A fluid port (not shown) may be provided in the side of the post 38 to aid in filling the space between the post 38 and the bellows 8. The open ends of the first and second bellows 8, 10 are sealed to the adjacent face of the first body 4 by any suitable process, e.g., electron beam welding.

An external sensor capsule 44 having a differential pressure fluid sensor provides an external sensor in a manner as shown in the aforesaid U.S. Pat. No. 4,072,058. The sensor capsule 44 is provided with a first internal chamber 44 connected by a first fluid pipe 46 to the threaded hole 36 and the fluid conduit 34 in the second transmitter body 4. A second internal chamber 48 in the sensor capsule 42 is connected by a second fluid pipe 50 to the threaded hole 24 and the fluid conduit 23 in the first transmitter body 2. The first chamber 44, the second fluid pipe 46 and the associated fluid conduits in the second body 4 are filled with a first incompressible fill fluid filling the space between the two bellows 8, 10 and the space between the second diaphragm 26 and the body face 27. The second chamber 48, the second fluid pipe 50 and the associated fluid conduits are filled with a second incompressible fill fluid which also fills the hollow post 38 and the space between the first diaphragm 12 and the body face 13. Accordingly, a sensor 52 located on a diaphragm 53 separating the first and second chambers 44, 48 is exposed to a differential pressure of the two fill fluids.

MODE OF OPERATION OF FIG. 1

The application of respective input pressures to the recesses 18 and 29 through the threaded pipe connections 16 and 30 is effective to apply corresponding differential pressures to the sensor 52 by means of the first and second fill fluids. An output signal from the sensor 52 is, accordingly, representative of a differential pressure derived from these input pressures. During the application of normal input pressures representative of the measuring range of the pressure transmitter, the diaphragm 12 and 26 remains spaced from their respective mating backup surfaces 13 and 27 and are effective to transmit the applied input pressures to the corresponding fill fluids. If an input pressure rises beyond the operating range of the pressure transmitter, the corresponding diaphragm is forced into a large physical excursion. During this excursion, the fill fluid between the diaphragm and the backup surface is forced into a fluid conduit opening into the space between the diaphragm and the backup surface. For example, if the input pressure to the recess 29 is in an overload state, the resulting movement of the diaphragm 26 forces the fill first fluid into the conduit 32 and into the space between the bellows 8 and 10. This fluid transfer induces an expansion of the bellows 8 when the overload pressure overcomes the preload applied to the bellows 8 by the post 33. The hollow post 38 maintains the inner bellows 10 in an expanded, or preloaded, condition against the end of the hollow post 38. The expansion of the bellows 8 provides a space for accommodating the fill fluid from beneath the diaphragm 26. The expansion of the bellows 8 is accompanied by a compression of the bellows 10 by the first fill fluid acting on the outside surface of the inner bellows 10. Thus, there is a transfer of the first fill fluid from beneath the diaphragm 26 when the bellows 8 is expanded and moved from its biased configuration. This transfer of fill fluid is terminated when the overload input pressure condition causes the diaphragm 26 to bottom against the mating surface 27 which position of the diaphragm 26 seals the fluid conduit 32 to prevent any further transfer of fill fluid into the conduit 32 and to isolate one side of the sensor 52. During this operation involving an overload input pressure, it should be noted that the expansion of the bellows 8 provides an overload protection for the sensor 52 by absorbing the fluid transfer without subjecting the diaphragm 53 and the sensor 52 to excessively high differential fluid pressures might cause damage to these elements.

In the case of an overload input pressure being applied to the diaphragm 12, the second fill fluid beneath the diaphragm 12 is forced into the conduits 20 and 22. In this overload operation, the inner bellows 10 is expanded away from the hollow post 38 by the transfer of the second fill fluid through the conduits 22 and 42 and the interior of the hollow post 38 when the overload pressure exceeds the preload applied to bellows 10 by the post 38. Prior to the expansion of the preloaded inner bellows 10, the outer bellows 8 is maintained against the post 33 by the second fill fluid acting through the fluid conduit 20 from the space between the diaphragm 12 and the support surface 13. As in the case of the diaphragm 26, described above, the second fill fluid transfer is terminated when the diaphragm 12 bottoms against the support surface 13 which seals the fluid conduits 20 and 22. The sealing of fluid conduit 22 isolates one side of the sensor 52 from the overload presssure. Accordingly, in the event of an overload input pressure being applied to the diaphragm 12, the sensor 52 and the diaphragm 53 are also protected against overload pressures by the transfer of the second fill fluid.

DETAILED DESCRIPTION OF FIG. 2

Figure 2:
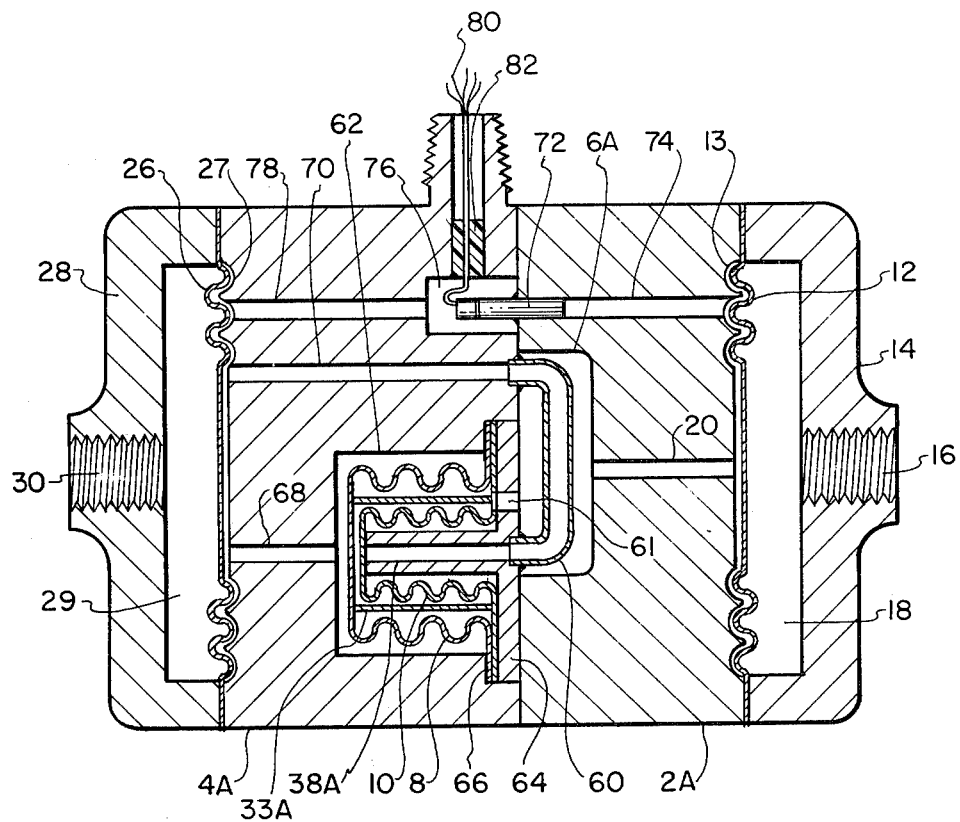

In FIG. 2, there is shown a cross-sectional illustration of another example of a pressure transmitter embodying the pressure overload protection structure of the present invention while having an internal differential pressure sensor. Similar reference numbers have been used in this illustration to indicate elements common to the pressure transmitter shown in FIG. 1 while modified elements have been indicated by the addition of a lettered suffix to the reference number. Thus, the body portions 2A and 4A are modified to accommodate different recesses and different fluid conduits. Further, the recesses 6A is of a different shape than the recess 6 shown in FIG. 1 since it is not used to accommodate the nested bellows 8, 10 but rather only a fluid transfer tube 60. The recess 6A is connected by the first fluid conduit 20 to the diaphragm backup surface 13 and by a port 61 to space between the nested bellows 8, 10. A recess 62 is provided in the body 4A for accommodating the nested bellows 8, 10. The outer bellows 8 is preloaded, or biased, by having an inner end surface of the bellows 8 in contact with an open end of a first hollow post 33A with the other end of the post 33A being sealed to a peripheral edge of the inner bellows 10 except for the port 61 which is effective to admit a fill fluid to both sides of the post 33A.

The inner bellows 10 is preloaded, or biased, by having an inner end surface of the inner bellows 10 is in contact with the open end of a hollow post 38A formed as an outwardly extending part of a plate 64. The peripheral free ends of the bellows 8, 10 are both captured in a fluid-tight seal between the peripheral edge of the plate 64 and an annular step 66 formed in the body 4A. The recess 62 is connected by a second fluid conduit 68 to the space between the second diaphragm 26 and the backup surface 27. The fluid transfer tube 60 is connected between the inside of the hollow post 38A and a third fluid conduit 70 also extending to a port opening into the space between the second diaphragm 26 and the backup surface 27. A fluid port (not shown) may be provided in the side of the port 33A to aid in filling the space between the post 33A and the bellows 8. A differential pressure sensing element 72, or capsule, has one input end located by a fluid-tight connection in a fourth fluid conduit 74 extending to the space between the first diaphragm 12 and the backup surface 13. The other input end of the sensor assembly 72 is located in a recess 76 within the second body 4A. The recess 76 is connected by a fifth fluid conduit 78 to the space between the second diaphragm 26 and the support surface 27. Electrical connection wires 80 are brought out of the recess 76 through a fluid tight plug 82 to the outside of the second body 4A. First and second fill fluids are located beneath corresponding ones of the first and second diaphragms 12 and 26 and within the associated fluid conduits.

MODE OF OPERATION OF FIG. 2

The overall operation of the pressure transmitter shown in FIG. 2 is basically similar to that described above with respect to the pressure transmitter shown in FIG. 1. Thus, the application of a first input fluid pressure into the first recess 18 is communicated through the first diaphragm 12 to the first fill fluid and subsequently through the fluid filled conduit 74 to one input end of the differential pressure sensing element 72. A second input fluid pressure applied to the second recess 29 is communicated through the diaphragm 26 to the second fill fluid and through the fluid conduit 78 to the other input end of the pressure sensing element 72. An output signal from the sensing element 72 is, accordingly, representative of a differential pressure derived from these input pressures. The application of normal input pressures representative of the measuring range of the pressure transmitter maintains a spaced condition of the diaphragms 12 and 26 from their respective mating back-up surfaces 13 and 27. If an input pressure rises beyond the operating range of the pressure transmitter, the corresponding diaphragm is urged towards its mating back-up surface to produce a transfer of the fill fluid from between the diaphragm and the back-up surface. For example, an overload pressure applied to the second diaphragm 26 produces a movement of this diaphragm towards its back-up surface 27 and a transfer of the second fill fluid located between the second diaphragm 26 and the back-up surface 27 into the fluid conduit 68. This fluid transfer is effective to maintain the outer bellows 8 against the end of the post 33A. Concurrently, the fill fluid is transferred into conduit 70 and connecting tube 60 into the hollow post 38A wherein it is used to expand the inner bellows 10 when the overload pressure exceed the preload of the bellows 10 induced by the post 38A. This transfer of the second fill fluid is terminated when the overload input pressure causes the diaphragm 26 to bottom against the mating surface 27 which position of the diaphragm 26 seals the fluid conduits 68, 70 and 78 to prevent any further transfer of the second fill fluid and isolates one side of the sensor 72. During this operation involving an overload input pressure, the transfer of the fill fluid, and the compression and expansion of the bellows 8, 10, respectively, provides a means for an overload protection for the sensor 72 by absorbing the fluid transfer without subjecting the sensor 72 to excessively high differential fluid pressures.

In the case of an overload input pressure being applied to the diaphragm 12, the first fill fluid between the diaphragm 12 and the back-up surface 13 is forced into the conduit 20 and the recess 6A. From the recess 6A, the fill fluid enters the space between the bellows 8 and 10 by means of the fluid port 61. This first fill fluid transfer induces an expansion of the outer bellows 8 when the overload pressure overcomes the preload applied to the bellows 8 by the post 33A while the hollow post 38 maintains the inner bellows 10 in an expanded, or preloaded, condition against the end of the hollow post 38A. Expansion of the bellows 8 provides a space for accommodating the first fill fluid transferred from beneath the diaphragm 12. Thus, there is a transfer of the first fill fluid from beneath the diaphragm 12 when the outer bellows 8 is expanded and moved from its biased configuration. This transfer of the first fill fluid is terminated when the overload input pressure causes the diaphragm 12 to bottom against the mating surface 13 which position of the diaphragm 12 seals the fluid conduits 20 and 74 to prevent any further transfer of the fill first fluid into the conduit 20 and to isolate one side of the sensor 72. During this operation, the expansion of the bellows 8 provides an overload protection for the sensor 72 by absorbing the fluid transfer without subjecting the sensor 72 to excessively high differential fluid pressures.

Accordingly, it may be seen, that there has been provided, in accordance with the present invention an improved pressure transmitter having an overload protection arrangement while accommodating either an external or internal fluid pressure sensor.

The embodiments of the invention in which an exclusive property or privilege is claimed are defined as follows:

1. A fluid pressure transmitter comprising
   a first diaphragm means responsive to a first input pressure,
   first incompressible fluid means in contact with said first diaphragm means,
   a differential pressure responsive means,
   a first fluid conduit means communicating said first fluid means to one side of said differential pressure responsive means,
   a second diaphragm means responsive to a second input pressure,
   a second incompressible fluid means in contact with said second diaphragm means,
   a second fluid conduit means communicating said second fluid means to the other side of said differential pressure responsive means,
   a first bellows means having an outside surface exposed to said first fluid means and an internal surface exposed to said second fluid means and
   a second bellows means located within said first bellows means and having an internal surface exposed to said first fluid means and an external surface exposed to said second fluid means.

2. A fluid pressure transmitter as set forth in claim 1 and further including a housing encompassing said first and second diaphragms, said first and second conduits, said first and second bellows and said differential pressure responsive means.

3. A fluid pressure transmitter as set forth in claim 1 and further including a housing means encompassing said first and second diaphragms, said first and second conduits means, said first and second bellows and further including first and second conduits external to said housing connecting respective ones of said first and second fluids to corresponding sides of said pressure responsive means.

4. A fluid pressure transmitter as set forth in claim 1 and further including a bellows preload means located with said first bellows to bias said first bellows to respond to a predetermined fluid pressure level.

5. A fluid pressure transmitter as set forth in claim 4 and further including a second bellows preload means located with said second bellows to bias said second bellows to respond to a predetermined fluid pressure level.

6. A fluid pressure transmitter as set forth in claim 1 wherein said first diaphragm means includes a first diaphragm and a first mating backup surface normally spaced from said first diaphragm, said first conduit means having a fluid port in said first backup surface, and said second diaphragm means includes a second diaphragm and a second mating backup surface normally spaced from said second diaphragm, said second conduit means having a fluid port in said second backup surface.

7. A fluid pressure transmitter as set forth in claim 6 and further including a bellows preload means located with said second bellows to bias said first bellows to respond a predetermined fluid pressure level.

8. A fluid pressure transmitter as set forth in claim 7 and further including a second bellows preload means located with said second bellows to bias said second bellows to respond to a predetermined fluid pressure level.

* * * * *